Oct. 2, 1928.  
T. H. THOMAS ET AL  
1,685,890
FLUID PRESSURE BRAKE DEVICE
Filed Oct. 14, 1927
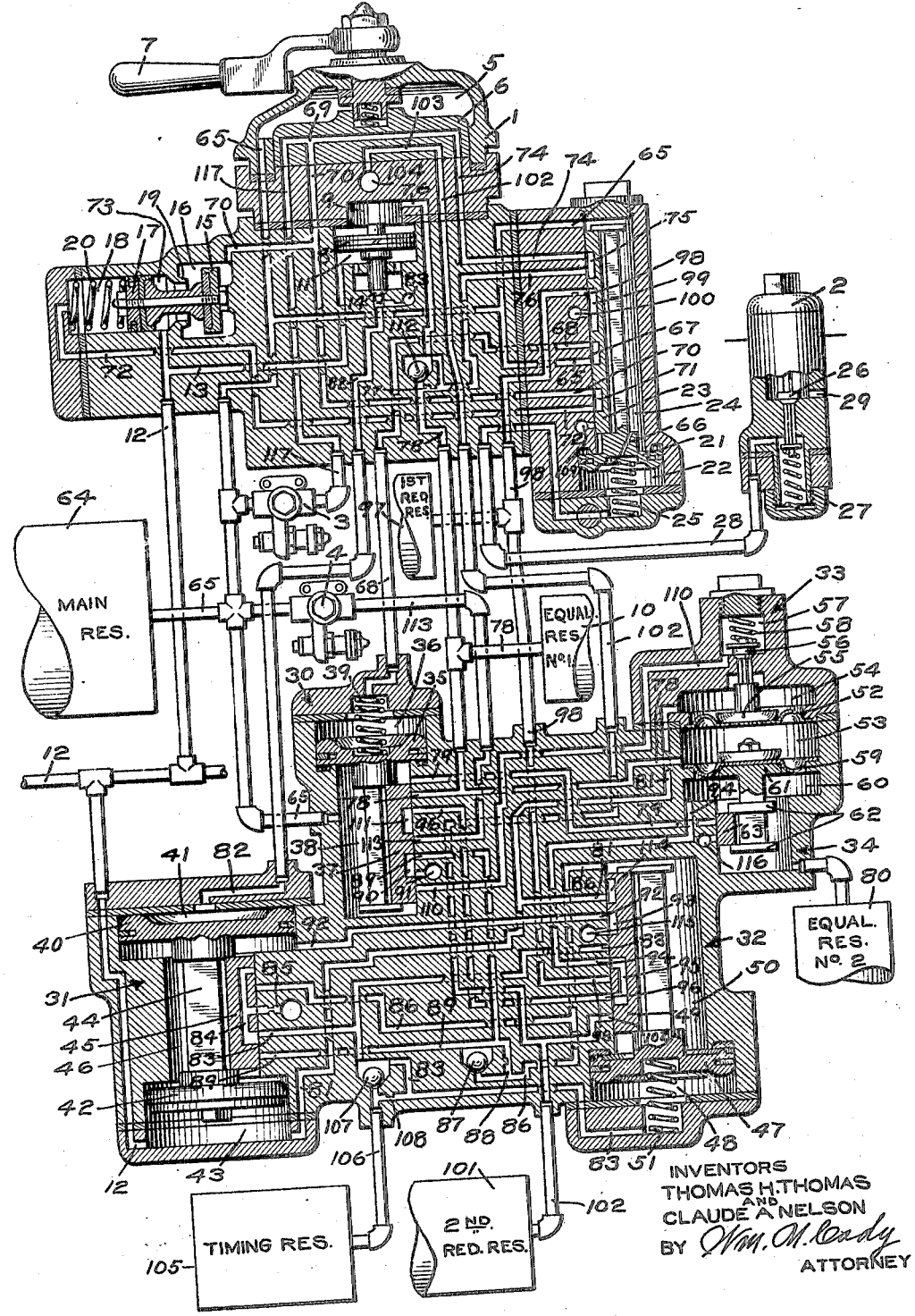
INVENTORS  
THOMAS H. THOMAS  
AND  
CLAUDE A. NELSON  
BY *Wm. M. Cady*  
ATTORNEY Patented Oct. 2, 1928.

1,685,890

UNITED STATES PATENT OFFICE.

THOMAS H. THOMAS, OF EDGEWOOD, AND CLAUDE A. NELSON, OF WILMERDING, PENNSYLVANIA, ASSIGNORS TO THE WESTINGHOUSE AIR BRAKE COMPANY, OF WILMERDING, PENNSYLVANIA, A CORPORATION OF PENNSYLVANIA.

FLUID-PRESSURE BRAKE DEVICE.

Application filed October 14, 1927. Serial No. 226,112.

This invention relates to fluid pressure brakes and more particularly to the type of locomotive brake equipment having automatic means for effecting successive reductions in brake pipe pressure, upon an automatic application of the brakes.

In order to obtain smooth and safe braking of a train, the reduction in brake pipe pressure must be started at such a rate as to cause the slack between the cars in a train to gather gently, otherwise the slack may be gathered so harshly as to cause intolerable shocks and in some cases sufficient to wreck a train. After the train slack is thus gathered, the rate of reducing the brake pipe pressure may be increased.

The principal object of our invention is to provide improved automatic means for effecting successive reductions in brake pipe pressure, the first of said reductions to be made at a predetermined slow rate irrespective of the degree of brake pipe leakage and after said first reduction is completed a second reduction is to be automatically made at a faster rate.

Other objects and advantages will appear in the following more detailed description of the invention.

In the accompanying drawing, the single figure is a diagrammatic view of a fluid pressure brake apparatus embodying our invention.

As shown in the drawing, the brake apparatus may comprise an automatic brake valve device 1, a magnet valve device 2, two feed valve devices 3 and 4, and a split or two stage reduction valve device.

The automatic brake valve device 1 comprises a casing, having a chamber 5 containing a rotary valve 6 adapted to be operated by a handle 7, and also containing an equalizing piston 8 forming, at one side, a chamber 9 connected to a No. 1 equalizing reservoir 10 and forming at the opposite side a chamber 11 connected to the usual brake pipe 12 through passage 13, said equalizing piston being adapted to operate a brake pipe discharge valve 14.

Associated with the brake valve device is a cut-off valve mechanism comprising a cut-off valve 15 contained in a chamber 16 and adapted to be operated by a piston 17, contained in a chamber 18. Said cut-off valve is adapted, in one position, to seal on a seat ring 19, the movement to said position being opposed by the pressure of a spring 20 acting on the cut-off valve piston 17.

Preferably associated with the brake valve device is an application valve mechanism comprising a piston 21 contained in a chamber 22 and a slide valve 23 contained in a valve chamber 24, the piston 21 being adapted to operate said slide valve. Outward movement of said application piston 21 is opposed by the pressure of a spring 25.

The magnet valve device 2 comprises a magnet, adapted to operate a valve 26 against the pressure of a spring 27. When the magnet is deenergized, as in territory governed by unfavorable track conditions, the spring 27 unseats the valve 26 so as to connect the application piston chamber to the atmosphere through passage and pipe 28 and pasage 29 in the magnet valve device, and when said magnet is energized, as in territory where the track conditions are favorable, the valve 26 is seated so as to cut off communication between the application piston chamber 22 and the atmosphere.

The split reduction device comprises a repeater valve portion 30, a control portion 31, a hold-back portion 32, a maintaining valve portion 33, and an equalizing valve portion 34.

The repeater valve portion 30 comprises a piston 35 contained in a chamber 36 and adapted to operate a slide valve 37 contained in a valve chamber 38. Outward movement of the repeater piston 35 is opposed by the pressure of a spring 39 contained in the piston chamber 36.

The control portion 31 comprises a piston 40 contained in a chamber 41 and a piston 42 contained in a chamber 43. Said pistons have different areas, are connected together by a stem 44, and are adapted to operate a slide valve 45 contained in a valve chamber 46 formed intermediate the piston chambers 41 and 43.

The hold back portion 32 comprises a piston 47 contained in a chamber 48 and adapted to operate a slide valve 49 contained in a valve chamber 50. Outward movement of the piston 47 is opposed by the pressure of a spring 51.

The maintaining valve portion 33 comprises a diaphragm 52 forming at one side, one wall of a chamber 53 and forming at the opposite side a chamber 54, said chamber 54 containing a follower 55 engaging the diaphragm 52 and having an upwardly projecting stem adapted to engage the fluted stem of a valve 56 contained in a chamber 57. Unseating of the valve 56 by upward movement of the follower 55, is opposed by the pressure of a spring 58 also contained in the valve chamber 57.

The equalizing valve portion 34 comprises an equalizing diaphragm 59, open at one side to the chamber 53 and forming at the opposite side a valve chamber 60. Contained in the valve chamber 60 and secured to the diaphragm 59 is a follower 61 having a downwardly extending stem with two flanges 62 formed thereon. Between said flanges is mounted a slide valve 63, which is adapted to be operated by deflection of the diaphragm 59.

In operation, fluid under pressure from a main reservoir 64 is supplied through pipes and passages 65 to the rotary valve chamber 5 of the automatic brake valve device, to the application valve chamber 24, to the seat of the application slide valve 23, to the repeater valve chamber 38 and to the feed valve devices 3 and 4.

Fluid at main reservoir pressure in the application valve chamber 24 flows through a port 66 in the application piston 21 and into the application piston chamber 22, and from thence through passage and pipe 28 to the spring chamber of the magnet valve device 2. With a train operating in territory governed by favorable track conditions, the magnet of the magnet valve device is energized and the valve 26 seated, so that fluid pressure is permitted to build up in the application piston chamber 22, and when the degree of fluid pressure becomes substantially equal to the fluid pressure in the valve chamber 24, the pressure of spring 25 shifts the application piston 21 and slide valve 23 to the release position, as shown in the drawing. Fluid at main reservoir pressure is then supplied from passage 65 to the repeater piston chamber 36 of the split reduction device, by way of cavity 67 in the application slide valve 23 and passage and pipe 68. When the fluid pressure in the repeater piston chamber becomes substantially equal to the pressure of the main reservoir fluid in the repeater valve chamber 38, the pressure of the spring 39 shifts the repeater piston 35 and slide valve 37 to the release position, as shown in the drawing.

Fluid at the usual reduced pressure carried in the brake pipe is supplied by the feed valve device 3 to the seat of the brake valve rotary valve 6 through pipe and passage 117 and with the brake valve device in running position, as shown in the drawing, fluid under pressure from said passage 117 flows through cavity 69 in the rotary valve 6 to passage 70 and from thence to the cut-off piston chamber 18 through cavity 71 in the application slide valve 23 and passage 72 and also from passage 70 to the cut-off valve chamber 16. With the brake system uncharged, the cut-off valve 15 and piston 17 are held in the position shown in the drawing, by the pressure of spring 20, and in charging, the opposing fluid pressures acting on the cut-off valve piston 17 are equal, so that the cut-off valve 15 is still held from the seat ring 19 by the pressure of spring 20, thereby permitting fluid under pressure from the cut-off valve chamber 16 to flow to the equalizing piston chamber 11 and to the brake pipe 12 by way of chamber 73, formed intermediate the seat ring 19 and the cut-off piston 17, and passage 13, thereby charging said brake pipe to the pressure normally carried.

Fluid at the reduced feed valve pressure also flows through cavity 69 in the brake valve rotary valve 6 to the equalizing piston chamber 9 by way of passage 74, cavity 75 in the application slide valve 23 and passage 76. The fluid pressures thus become substantially equal on the opposite sides of the equalizing piston 8, which piston then operates to hold the discharge valve 14 seated. Fluid at feed valve pressure also flows from passage 76 through a choked passage 77 and passage and pipe 78 to the No. 1 equalizing reservoir 10 and to the diaphragm chamber 53 of the split reduction device, in which chamber said fluid pressure deflects the diaphragm 59 and causes the slide valve 63 to be shifted downwardly, so as to uncover the passage 79. Fluid at main reservoir pressure is then permitted to flow from the repeater valve chamber 38 through said passage 79 to the equalizing valve chamber 60 and to the No. 2 equalizing reservoir 80. When the fluid pressures in chamber 60 and in the No. 2 equalizing reservoir 80 becomes substantially equal to the opposing pressure of the No. 1 equalizing reservoir fluid in chamber 53, the diaphragm returns to its normal position, as shown in the drawing, thereby causing the slide valve 63 to lap the passage 79 so as to prevent a further increase in the pressure in the No. 2 equalizing reservoir.

Fluid at brake pipe pressure is supplied to the maintaining valve diaphragm chamber 54 through the control piston chamber 43 and passage 81, and since when the brake system is charged, the brake pipe pressure is substantially equal to the pressure of the fluid in the No. 1 equalizing reservoir and diaphragm chamber 53, the opposing fluid pressures on the diaphragm 52 are balanced and the pressure of spring 58 is permitted to hold the maintaining valve 56 seated.

The control piston chamber 41 is connected through pipe and passage 82 to the atmospheric passage 83, so that when the discharge valve 14 is seated, the piston chamber is at atmospheric pressure.

The control piston 40 being thus subject to atmospheric pressure and the piston 42 to brake pipe pressure in chamber 43, said pistons and slide valve 45 are maintained in the upper position, as shown in the drawing, in which position the hold back piston chamber 48 is vented to the atmosphere through passage 83, cavity 84 in the control slide valve 45 and the choked atmospheric passage 85. Since the hold back valve chamber 50 is also at atmospheric pressure, on acount of the connection through passage 86, past the ball check valve 87 and also through a choked passage 88, through passage 89, cavity 90 in the repeater slide valve 37 in release position and then the atmospheric passage 91, the pressure of spring 51 is permitted to hold the hold back piston 47 and slide valve 49 in the normal position, as shown in the drawing. A timing reservoir 105 is connected to the vented passage 83, from the hold back piston chamber 48, by way of pipe and pasage 106, past a ball check valve 107 and also through a choked passage 108, so that said reservoir is also normally at atmospheric pressure.

With the hold back portion 32 in the normal position, the control valve chamber 46 is vented to the atmosphere through passage 92, cavity 93 in the hold back slide valve 49 and the atmospheric passage 115 for a reason to be hereinafter described. The No. 2 equaliizng reservoir 80 is also connected to the seat of the repeater slide valve 37 by way of the equalizing valve chamber 60, passage 94, cavity 95 in the hold back slide valve 49 and passage 96.

With the application slide valve 23 in the normal release position, a first reduction reservoir 97 is vented to the atmosphere through pipe and passage 98, cavity 99 in the application slide valve 23 and the atmospheric passage 100. A second reduction reservoir 101 is also vented to the atmosphere through pipe and passage 102, cavity 103 in the brake valve rotary valve 6 and atmospheric exhaust port 104.

If the signal indication changes, due to unfavorable track conditions, the magnet of the magnet valve device 2 becomes deenergized and spring 27 unseats the magnet valve 26, which permits the fluid under pressure from the application piston chamber 22 to be vented to the atmosphere through passage and pipe 28, and the exhaust passage 29. The pressure of the main reservoir fluid in the application slide valve chamber 24 then shifts the application piston 21 and slide valve 23 to the downward or application position, in which position communication is cut off from the feed valve device 3 to the No. 1 equalizing reservoir 10, the equalizing piston chamber 9 and diaphragm chamber 53 of the split reduction device. The cut-off valve piston chamber 18 is also vented to the atmosphere through passage 72, cavity 71 in the application slide valve 23 and the atmospheric passage 109, so that the opposing pressure of the brake pipe fluid in chamber 73 is permitted to shift the cut-off valve piston outwardly against the pressure of spring 20 and thereby seat the cut-off valve 15 against the seat ring 19, so as to prevent further flow of fluid from the cut-off valve chamber 16 and the feed valve device 3 to the brake pipe 12. The repeater piston chamber 36 in the split reduction device is also vented to the atmosphere through passage 68 in the automatic brake valve device, cavity 99 in the application slide valve 23 and the atmospheric passage 100, and the pressure of the main reservoir fluid in the repeater slide valve chamber 38 then shifts the repeater piston 35 and slide valve 37 upwardly to application position, in which position, said slide valve laps passage 79, so as to cut off communication from valve chamber 38 and the main reservoir to passage 79 and at the same time a passage 110 is opened to the repeater slide valve chamber 38 so that main reservoir fluid can flow through said passage to the maintaining valve chamber 57. The No. 2 equalizing reservoir 80 is also connected to the No. 1 equalizing reservoir 10 by way of passage 94, cavity 95 in the hold back slide valve 49, passage 96, cavity 111 in the repeater slide valve 37 and passage and pipe 78, thereby providing an enlarged equalizing reservoir volume for a reason to be hereinafter described.

In application position of the repeater slide valve 37, fluid at a reduced pressure employed in the operation of the split reduction device is supplied by the feed valve device 4 to the seat of the control slide valve 45 by way of pipe and passage 113, cavity 90 in the repeater slide valve 37 and passage 89 and from said passage 89 fluid also flows to the hold back valve chamber 50 by way of the choked passage 88 and passage 86 and a pressure is built up in said valve chamber at a slow predetermined rate.

In application position of the application slide valve 23, the No. 1 and No. 2 equalizing reservoirs and the equalizing piston chamber 9 are connected to the first reduction reservoir 97 through passage 78, past the ball check valve 112, through passage 76, cavity 75 in the application slide valve 23 and the choked passage and pipe 98. The atmospheric connection of the first reduction reservoir is cut off by the application slide valve 23, and then the pressure of the fluid in the connected No. 1 and No. 2 equalizing reservoirs and in the equalizing piston chamber 9 reduces to a predetermined degree, as permitted by equalization into said first reduction reservoir. In the well known manner, the higher brake pipe pressure in the equalizing piston chamber 11 then causes the equalizing piston 8 to operate the discharge valve 14, so as to cause a corresponding degree of reduction in brake pipe pressure.

The fluid under pressure vented from the brake pipe past the discharge valve 14 flows into passage 82 which is connected to the atmosphere through the restricted passage 83. The capacity of said restricted passage is less than the venting capacity of the discharge valve 14, so that a pressure is built up on the control piston 40 through passage and pipe 82. The area of piston 40 being greater than that of the connected piston 42, which is subject to brake pipe pressure in chamber 43, the pressure of the fluid acting on the piston 40 shifts the control pistons 40 and 42 and slide valve 45 downwardly to the first reduction position, in which position fluid at the reduced pressure supplied by the feed valve device 4 is permitted to flow from passage 89 to the hold back piston chamber 48 by way of cavity 84 in the control slide valve 45 and passage 83, and from passage 83 to the timing reservoir 105 through the choked passage 108 and passage and pipe 106. Fluid pressure is also quickly built up in the hold back valve chamber 50, since fluid from passage 89 also flows to said chamber through cavity 84 in the control slide valve and passage 86. The fluid pressures thus becoming equal on the opposite sides of the hold back piston 47, said piston and slide valve 49 are held in the inner or first reduction position by the spring 51.

When the brake pipe pressure has been reduced to a degree substantially equal to the reduced pressure in the equalizing reservoirs, the equalizing piston 8 closes the brake pipe discharge valve 14. After the pressure of the fluid in the control piston chamber 41 is then reduced through the choked passage 83 in the brake valve device to a predetermined degree, the pressure of the brake pipe fluid in the control piston chamber 43 shifts the control pistons and slide valve 45 to their upward position, in which position the fluid under pressure in the hold back piston chamber 48 and timing reservoir 105 is permitted to flow to the atmosphere at a restricted rate through pipe 106, past the ball check valve 107, through passage 83, cavity 84 in the control slide valve 45 and the choked atmospheric passage 85. When the pressure acting on the hold back piston 47 is thus reduced to a predetermined degree, the higher pressure of the fluid in the hold back valve chamber 50 shifts the hold back piston 47 and slide valve 49 to the outer or second reduction position against the pressure of spring 51. In this second reduction position the No. 2 equalizing reservoir 80 is separated from the No. 1 equalizing reservoir 10 by the hold back slide valve lapping the passages 94 and 96 leading to said reservoirs. Cavity 95 in said slide valve connects passage 98 from the first reduction reservoir 97 to passage 102 leading to the second reduction reservoir 101 so that the pressure of the fluid in the first reduction reservoir 97 and the No. 1 equalizing reservoir 10 is permitted to further reduce by flowing into the second reduction reservoir. Said further reduction in equalizing reservoir pressure and consequently the pressure in the equalizing piston chamber 9, causes the equalizing piston 8 to again operate the discharge valve 14 so as to effect a second reduction in brake pipe pressure.

When the hold back piston 47 and slide valve 49 move to the second reduction position, fluid at brake pipe pressure is supplied from the control piston chamber 43 to the control valve chamber 46 by way of passage 81, cavity 114 in the hold back slide valve 49 and passage 92, so that the fluid discharged from the brake pipe to the control piston chamber 41 during the second reduction, can not shift the control pistons 40 and 42 and slide valve 45 to their downward position, particularly against the frictional resistance of said control pistons and slide valve. This is desirable, since if the control portion 31 were permitted to shift to first reduction position, while effecting the second reduction, it would cause the hold back portion 32 to again operate as during the first reduction and thereby prevent a second reduction from being made.

In order to limit the total degree of brake pipe reduction to that necessary for effecting a full service application of the brakes, the brake valve handle 7 is operated to turn the rotary valve 6 to lap position, so as to lap the passage 102 from the second reduction reservoir. The extent to which the pressure in the No. 1 equalizing reservoir is reduced is thereby limited to the degree at which the No. 1 equalizing reservoir equalizes.

It will be noted, that in effecting a brake application in the manner described above, that the rate of reduction in pressure or the rate of flow of fluid under pressure from the No. 1 and No. 2 equalizing reservoirs or from the No. 1 equalizing reservoir only, to the reduction reservoirs is governed by the choke portion of passage 98. Since the No. 1 and No. 2 equalizing reservoirs are connected during the first reduction, a longer time is therefore required to effect a predetermined reduction in pressure in their combined volumes than is required to effect a corresponding reduction in the pressure in the No. 1 equalizing reservoir only, as is the case while the second reduction is being effected. The relation of the combined volumes of the two equalizing reservoirs and the choked passage 98 may be such that the first reduction continues substantially for a period of time corresponding with the period of time required to gather the slack on a long train, while the volume of the No. 1 equalizing reservoir may be such as to cause the second reduction to occur at a faster rate, corresponding substantially to the rate employed in the usual locomotive equipment.

According to our invention, the brake pipe pressure can not reduce at a rate exceeding the rate of reduction in the pressure of the fluid in the equalizing reservoirs and in the diaphragm chamber 53 of the split reduction device. If the rate of brake pipe leakage is greater than the rate at which the equalizing reservoir pressure reduces, the brake pipe pressure acting in diaphragm chamber 54 of the maintaining portion 33 of the split reduction device, will fall below that in the equalizing reservoir and acting in the diaphragm chamber 53. The slightly higher pressure in chamber 53 then deflects the diaphragm 52 upwardly, which causes the follower 55 to open the maintaining valve 56, so as to permit fluid at main reservoir pressure to flow into the brake pipe 12 by way of the repeater slide valve chamber 38, passage 110, the maintaining valve chamber 57, diaphragm chamber 54, passage 81 and the control piston chamber 43. Such flow of fluid into the brake pipe 12 maintains the brake pipe pressure at substantially the same degree as the reducing equalizing reservoir pressure.

In the normal release position of the apparatus, the No. 1 and No. 2 equalizing reservoirs are disconnected from each other and only the No. 1 equalizing reservoir 10 is connected to the brake valve device, so that when the automatic control apparatus is not operating, the apparatus corresponds substantially to the usual locomotive brake equipment, and an engineer may then manually cause a brake application to be effected in the usual manner.

In order to have the split reduction device instantly operative, as in case of an automatic application of the brakes is initiated while the engineer is manually effecting a brake application, the equalizing portion 34 of the split reduction device is adapted to maintain the pressure in the No. 2 equalizing reservoir substantially equal to the pressure in the No. 1 equalizing reservoir, which latter pressure is being reduced by the engineer. The reduction in pressure in the No. 1 equalizing reservoir and the connected diaphragm chamber 53 permits the higher pressure in the No. 2 equalizing reservoir to deflect the diaphragm 59 upwardly, thereby causing the slide valve 63 to shift and uncover the atmospheric exhaust port 116, through which fluid under pressure from the No. 2 equalizing reservoir 80 is permitted to reduce by flow to the atmosphere. The equalizing portion 34 will thus operate to maintain the pressure in said two equalizing reservoirs at substantially the same degree. If, after a partial manual brake application is effected, an automatic application is initiated, said automatic application starts by reducing the pressure in the two equalizing reservoirs from the pressure at which the manual application was stopped. If under such conditions the pressure in the No. 2 equalizing reservoir had not been reduced, then connecting the two equalizing reservoirs would permit a flow of fluid under pressure from the No. 2 to the No. 1 equalizing reservoir, which would cause an increase in pressure in the No. 1 equalizing reservoir, which increase in pressure would have to be reduced before a further reduction in brake pipe pressure could take place and consequently the further automatic brake application would be delayed.

It will be noted that the repeater valve portion 30 of the split reduction device and the application valve portion of the brake valve device always operate substantially at the same time. The functions of both of these valve portions could be included in either one or the other, but in order to permit this split reduction device to be employed with automatic brake valves of the type having application valve portions associated therewith, and used with automatic train control apparatus already in service, the construction as shown is preferable.

While one illustrative embodiment of the invention has been described in detail, it is not our intention to limit its scope to that embodiment or otherwise than by the terms of the appended claims.

Having now described our invention, what we claim as new and desire to secure by Letters Patent, is:—

1. The combination with a brake pipe, of means for effecting a reduction in brake pipe pressure in two stages including an equalizing reservoir, means operating upon a reduction in pressure in said reservoir for effecting a reduction in brake pipe pressure, a second equalizing reservoir, and means operating in effecting the first stage of reduction in brake pipe pressure for connecting the second equalizing reservoir to the first equalizing reservoir.

2. The combination with a brake pipe, of means for effecting a reduction in brake pipe pressure in two stages including an equalizing reservoir, means operating upon a reduction in pressure in said reservoir for effecting a reduction in brake pipe pressure, a second equalizing reservoir, and means operating in effecting the first stage of reduction in brake pipe pressure for connecting the second equalizing reservoir to the first equalizing reservoir and operating upon effecting the second stage of reduction in brake pipe pressure for disconnecting the second reservoir from the first.

3. The combination with a brake pipe, of means for effecting a reduction in brake pipe pressure in two stages including two equalizing reservoirs and means for venting fluid from both reservoirs to effect the first stage of reduction in brake pipe pressure and from only one of said reservoirs to effect the second stage of reduction in brake pipe pressure.

4. The combination with a brake pipe, of means for effecting a reduction in brake pipe pressure in two stages including means operative upon a venting of fluid from an equalizing reservoir volume to a reduction reservoir volume for effecting a reduction in brake pipe pressure, two equalizing reservoirs, two reduction reservoirs, and means for venting fluid from both equalizing reservoirs to only one of said reduction reservoirs in effecting the first stage of reduction in brake pipe pressure and for venting fluid from only one of said equalizing reservoirs to both reduction reservoirs in effecting the second stage of reduction in brake pipe pressure.

5. The method of effecting a reduction in brake pipe pressure in two stages which consists in effecting the first reduction in brake pipe pressure by venting fluid from a large equalizing reservoir volume to a small reduction reservoir volume and effecting the second reduction in brake pipe pressure by venting fluid from a small reservoir volume to a large reduction reservoir volume.

6. The method of effecting a reduction in brake pipe pressure in two stages which consists in effecting the first reduction in brake pipe pressure by venting fluid from two equalizing reservoirs to one reduction reservoir and effecting the second reduction in brake pipe pressure by venting fluid from one equalizing reservoir to two reduction reservoirs.

7. The combination with a brake pipe, of an equalizing reservoir, means operated upon a reduction in pressure in said reservoir, for effecting a reduction in brake pipe pressure, and means operated upon the brake pipe pressure reducing at a greater rate than the equalizing reservoir pressure reduces for supplying fluid under pressure to the brake pipe.

8. The combination with a brake pipe, of an equalizing reservoir, a reduction reservoir, means operated upon venting fluid from said equalizing reservoir to said reduction reservoir for effecting a reduction in brake pipe pressure, and means operated upon the brake pipe pressure reducing at a greater rate than the pressure in the equalizing reservoir is reduced for supplying fluid under pressure to the brake pipe.

9. The combination with a brake pipe, of an equalizing reservoir, a reduction reservoir, means operated upon venting fluid from said equalizing reservoir to said reduction reservoir for effecting a reduction in brake pipe pressure, and means subject to the opposing pressures of the equalizing reservoir and the brake pipe for supplying fluid under pressure to the brake pipe to thereby maintain the brake pipe pressure substantially equal to the pressure in the equalizing reservoir.

10. The combination with a brake pipe, of means for effecting a reduction in brake pipe pressure in two stages including two equalizing reservoirs, means operated upon a reduction in pressure in said reservoirs for effecting a reduction in brake pipe pressure, and valve means subject to the opposing pressures of said reservoirs and operating upon a decrease in pressure in one reservoir for venting fluid from the other reservoir.

11. The combination with a brake pipe, of means for effecting a reduction in brake pipe pressure in two stages including two equalizing reservoirs, means operated upon a reduction in pressure in said reservoirs for effecting a reduction in brake pipe pressure, and valve means operating upon an increase in pressure in one reservoir for supplying fluid under pressure to the other reservoir.

12. The combination with a brake pipe, of means for effecting a reduction in brake pipe pressure in two stages including two equalizing reservoirs, means operated upon a reduction in pressure in said reservoirs for effecting a reduction in brake pipe pressure, and valve means subject to the opposing pressures of said reservoirs and operating upon an increase in pressure in one reservoir for supplying fluid under pressure to the other reservoir.

13. The combination with a brake pipe, of means for effecting a reduction in brake pipe pressure in two stages including two equalizing reservoirs, means operated upon a reduction in pressure in said reservoirs for effecting a reduction in brake pipe pressure, and valve means operating upon a decrease in pressure in one reservoir for venting fluid under pressure from the other reservoir and upon increase in pressure in one reservoir for supplying fluid under pressure to the other reservoir.

14. The combination with a brake pipe and a brake valve device, of two equalizing reservoirs, means operated upon a reduction in pressure in said reservoirs for effecting a reduction in brake pipe pressure, traffic controlled means for effecting a reduction in pressure in said reservoirs, and means for effecting a reduction in brake pipe pressure by the operation of said brake valve device by venting fluid from one only of said reservoirs.

15. The combination with a brake pipe, of means for effecting a reduction in brake pipe pressure in two stages including two equalizing reservoirs, two reduction reservoirs, means operated upon venting fluid from said equalizing reservoirs to said reduction reservoirs for effecting a reduction in brake pipe pressure, valve means having one position in which said equalizing reservoirs are connected and another position in which said reduction reservoirs are connected, and means for controlling the operation of said valve means.

16. The combination with a brake pipe, of means for effecting a reduction in brake pipe pressure in two stages including two equalizing reservoirs, two reduction reservoirs, means operated upon venting fluid from said equalizing reservoirs to said reduction reservoirs for effecting a reduction in brake pipe pressure, valve means having a position in which the first stage of reduction in brake pipe pressure is effected and in which the two equalizing reservoirs are connected together, and a position in which the second stage of reduction in brake pipe pressure is effected and in which the two reduction reservoirs are connected together, and means for controlling the operation of said valve means.

In testimony whereof we have hereunto set our hands this 6th day of October, 1927.

THOMAS H. THOMAS.
CLAUDE A. NELSON.